United States Patent [19]

Marx et al.

[11] Patent Number: 5,419,949
[45] Date of Patent: May 30, 1995

[54] HEAT RECOVERABLE PRODUCT

[75] Inventors: Karl-Heinz Marx, Garbsen; Franz Grajewski, Lindhorst, both of Germany

[73] Assignee: Yabelmetall Electro GmbH, Hanover, Germany

[21] Appl. No.: 2,533

[22] Filed: Jan. 4, 1993

Related U.S. Application Data

[60] Continuation of Ser. No. 816,751, Jan. 2, 1992, abandoned, which is a division of Ser. No. 379,093, Jul. 13, 1989, Pat. No. 5,141,812.

[30] Foreign Application Priority Data

| Jul. 13, 1988 [DE] | Germany | 38 23 649.1 |
| Sep. 21, 1988 [DE] | Germany | 38 31 996.9 |
| Oct. 1, 1988 [DE] | Germany | 38 33 415.1 |

[51] Int. Cl.$^6$ .................................. D03D 13/00
[52] U.S. Cl. ................................ 428/222; 428/34.9; 428/36.2; 428/36.3; 428/229; 428/230; 428/247; 428/259; 428/286; 428/288; 428/294; 428/295; 428/377
[58] Field of Search .......... 428/247, 257, 258, 259, 428/284, 286, 288, 294, 295, 902, 222, 229, 34.9, 36.2, 36.3, 37, 230, 377; 264/230, 264, 342 R; 156/84, 85, 86

[56] References Cited

U.S. PATENT DOCUMENTS

| 2,539,301 | 1/1951 | Foster | 428/230 |
| 2,836,529 | 5/1958 | Morris | 428/257 |
| 3,625,809 | 12/1971 | Caroselli et al. | 161/91 |
| 4,283,454 | 8/1981 | Buchanan | 428/259 |
| 4,631,098 | 12/1986 | Pithouse et al. | 428/257 |
| 4,816,309 | 3/1989 | Hutt et al. | 428/34.5 |
| 4,816,326 | 3/1989 | Jones et al. | 428/224 |
| 5,014,755 | 5/1991 | Bompard et al. | 139/420 A |
| 5,048,441 | 9/1991 | Quigley | 114/90 |
| 5,110,656 | 5/1992 | Inaba et al. | 428/257 |
| 5,171,617 | 12/1992 | Affolderbach et al. | 428/34.9 |
| 5,188,872 | 2/1993 | Quigley | 428/36.2 |
| 5,266,393 | 11/1993 | Grajewski | 428/229 |

Primary Examiner—Patrick J. Ryan
Assistant Examiner—Marie R. Macholl

[57] ABSTRACT

A flat, heat recoverable shrink object is comprised of a plurality of core strands placed in a parallel position and each having a polymeric, thermoplastic or crosslinked core around which is coiled a high tensile strength thread such as glass, metal, cotton polyamide etc. These core strands are combined with high strength threads extending transverse to the core strands and being e.g. interwoven or looped or just superposed; All these parts are embedded in a crosslinked, heated stretched and cooled-again polymer layer whereby the coiled helices are stretched accordingly. This flat object is applied to other objects for being heat shrunk thereon. The two high strength threads tear proof the object particularly during its being made.

24 Claims, 7 Drawing Sheets

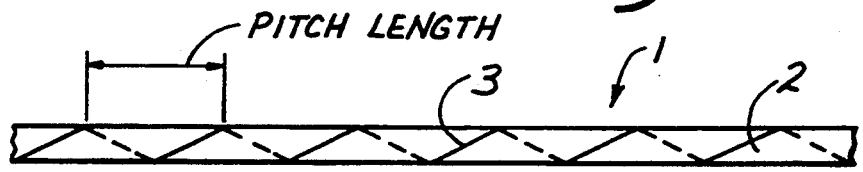
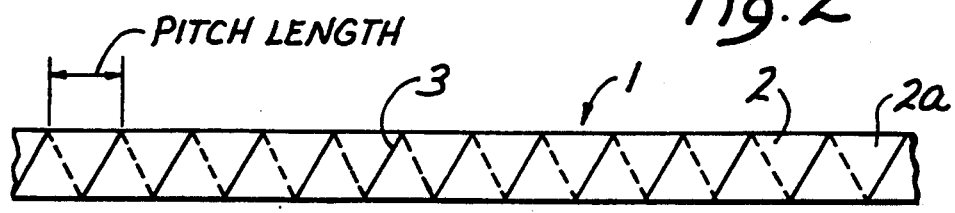
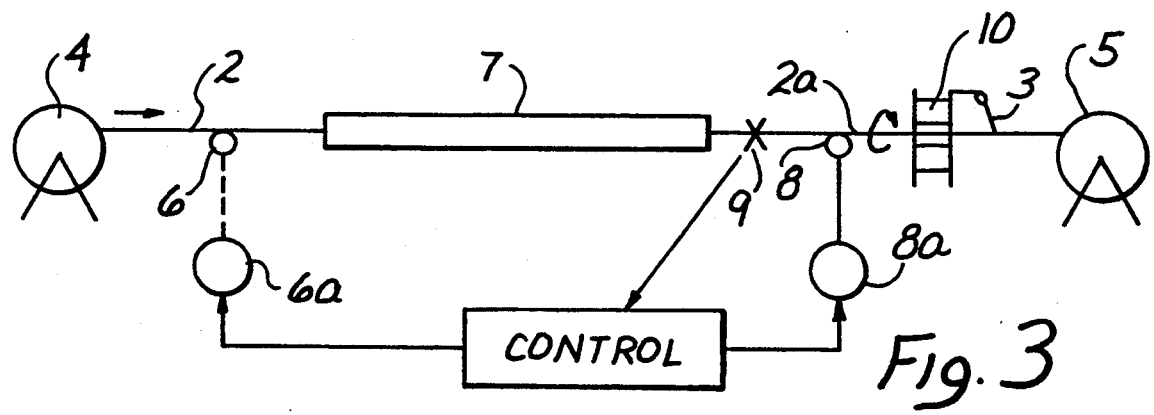
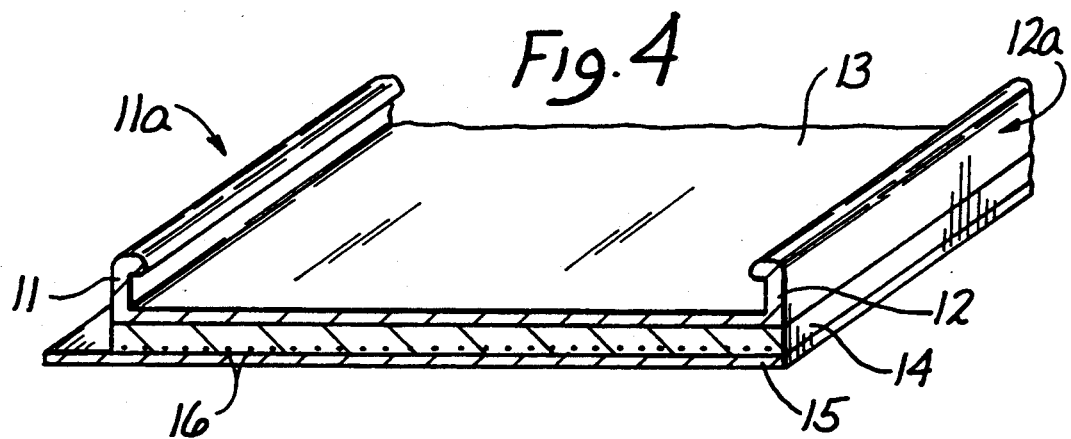

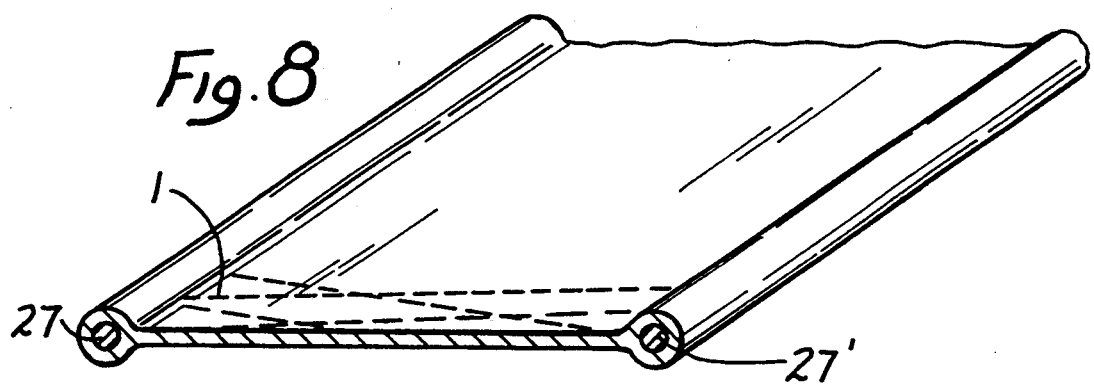
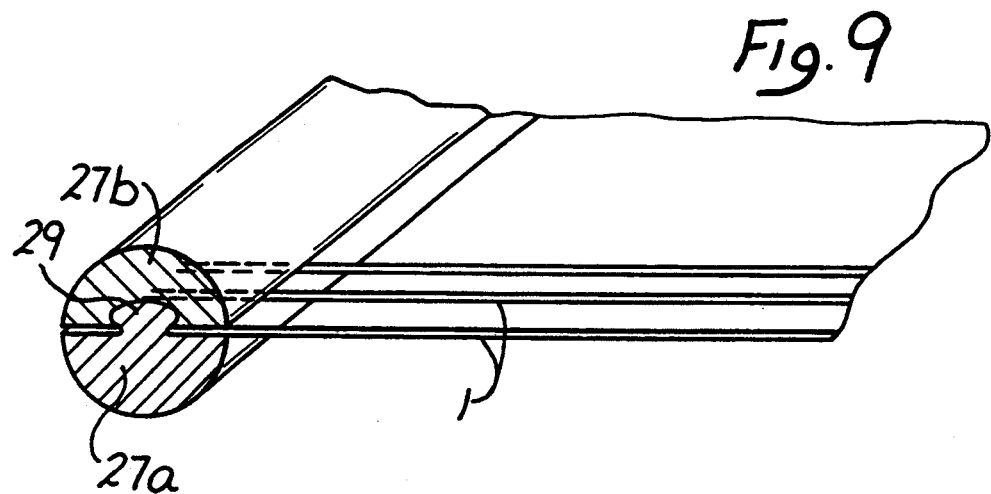
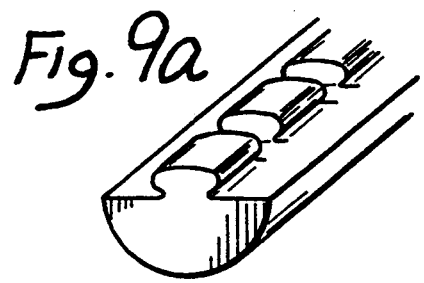
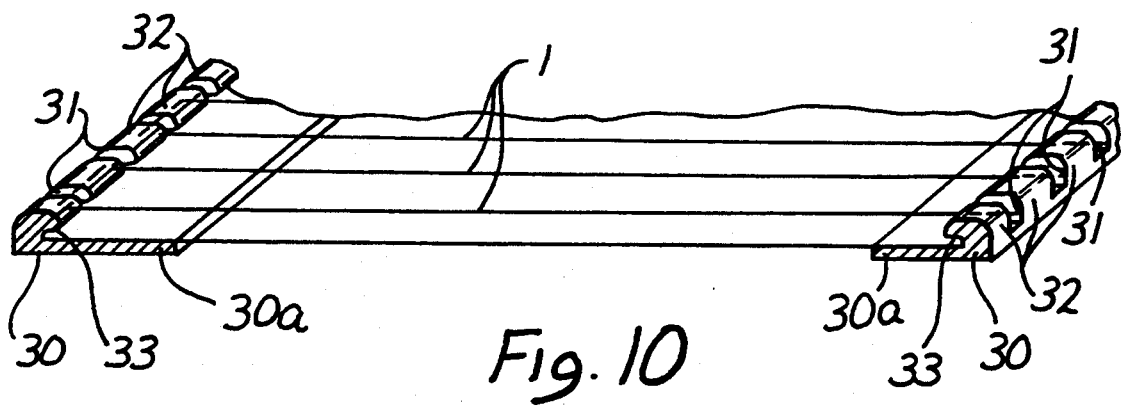

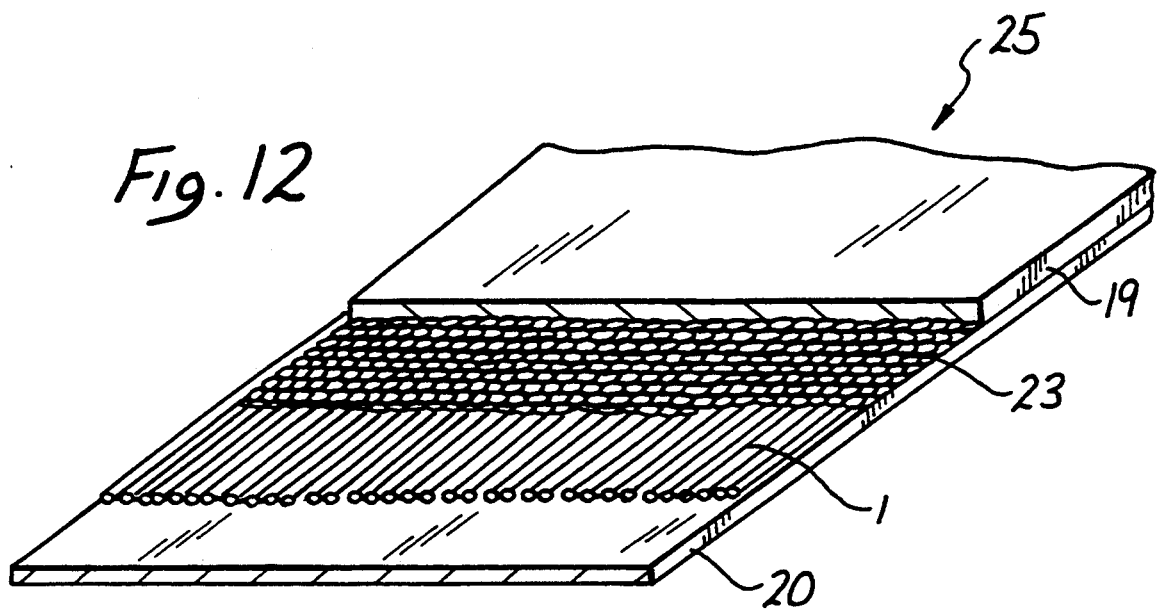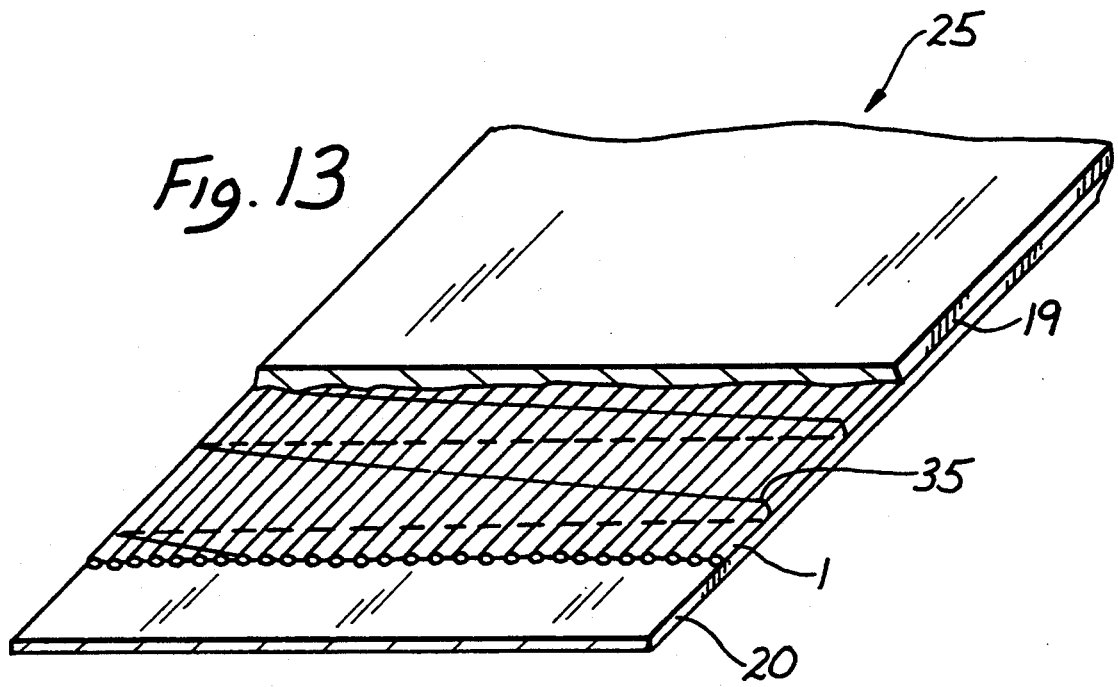

HEAT RECOVERABLE PRODUCT

This is a continuation of application Ser. No. 07/816,751, filed Jan. 2, 1992, (abandoned) which in turn was a divisional application of the then copending application 379,093 filed Jul. 13, 1989, now U.S. Pat. No. 5,141,812.

BACKGROUND OF THE INVENTION

The present invention relates to elongated stock such as particularly shaped strings and strands made of a polymer and serving as a preliminary product for the manufacture of heat-recoverable, i.e. heat-shrinkable, objects.

European Patent $A_2$-0115905 discloses a heat-shrinkable object made of a mesh and being composed of threads some of which are heat-shrinkable but others are not. The heat- shrinkable threads are usually, in this case, made of a polymer, while the non-heat-shrinkable threads are made of polyester or glass fibers. This known mesh has the disadvantage that the tensile strength of the heat-shrinkable material, particularly at shrinking temperature which is about 130°–150° centigrade, is very low; any slight mechanical overload can readily tear some of these threads.

DESCRIPTION OF THE INVENTION

It is an object of the present invention to provide a new and improved string, thread, strand or the like as an individual product for the making of heat-recoverable and heat-shrinkable objects having a considerable larger tear strength than those products known before.

It is another object of the present invention to provide for a new and improved heat recoverable flat object such as a ribbon;

it is a further object of the present invention to provide a new and improved heat recoverable sleeve for use as splice;

it is a still further object of the present invention to provide new and improved methods for making these objects and items.

In accordance with the preferred embodiment of the present invention, it is suggested to provide a polymer strand, fiber, string, or the like, with a wrapping, spinning, mesh, braiding, or the like, made at least of a material, having a very high tensile strength, and remaining particularly strong at the softening temperature of the polymer, whereby the wrapping threads strands or strings have a pitch angle smaller than 90° but larger than 0° in relation to the longitudinal axis of the strand being wrapped in this fashion. The wrapping, braiding, etc., therefore, provides a reinforcing layer and offers the advantageous property that without any problem owing to stretching or contraction of the strand being wrapped, the high strength wrapping can readily follow these contours and cross-sectional changes.

The cross-section of the strand being wrapped can be of any configuration. For example, in many cases, of course, the cross-section will be round, but, in other instances, it may be oval, elliptical, triangular, rectangular, trapezoidal, or the like; actually any other cross-section can be used on which the invention can be practiced.

The materials chosen for the wrapping threads, such as a single string or a mesh, braid, and so forth, are preferably comprised of cotton, metal, glass, ceramic, or combinations thereof. Also suitable are strands, threads, and ribbons, made of high temperature resistant material such as polyester, polyamide, or the like. Of particular advantage is to provide upon the strand core to be wrapped, a simple wrapping by coiling a thread in a helical configuration. Such helical wrapping can be manufactured at a very high speed. The wrapping may be provided through several similar pitch threads and so forth. Alternatively, several threads, ribbons, or tapes, or the like with opposite pitch can be placed, to thereby producing a mesh in situ.

The main strand core being wrapped is preferably a cross-linked polymer because the cross-linking is, in many instances, a very advantageous property for heat recovery, i.e. heat-shrinking. In between the strand, being wrapped, and the wrapping itself maybe provided with a layer, for example, of a thermoplastic polymer upon which the reinforcing thread is then placed directly. The thermoplastic layer is made simultaneously with the core strand. As the strand core is made of a cross-linkable polymer, the thermoplastic layer is a co-extruded layer thereon. This protective thermoplastic layer has the advantage that it provides its carrier with the capability of connecting it through melt welding with other thermoplastic components. This, for example, means that strands used as a core can be arranged in juxtaposition to others, and these strands are welded together, for example, in spots where they engage, as well as in isolated points, to obtain a mesh.

The inventive strand and reinforcement is made in accordance with the following novel method. Here then first a basic carrier strand core is made by extruding a polymer following which that core is cross-linked. In a continuous process the cross-linked strand is heated to a temperature above the crystallite melting point of the particular polymer, is stretched at that temperature and then cooled down while maintained in the stretch state. Next a high tensile strength thread means is applied as a wrapping, spinning braiding or just coiling to establish on the core a reinforcing layer whereby it is conceivable that the carrier is in the stretched low temperature state. A rather small pitch angle of the thread should be chosen in this case. In accordance with the alternative possibility, the reinforcing wrapping layer is placed onto the strand core prior to stretching and heating and to the subsequent cooling occurs on the assembly together. In this case, the pitch angle of wrapping should be large.

In all cases, the pitch angle, as understood here, is the angle between the longitudinal axes of the substrate (polymer strand core) and the thread fibre, ribbon, etc., as it is being applied to and wrapped (coiled) around the periphery of the core. Another terminology uses the term pitch length, which is the distance in longitudinal direction between two similar "phase points" of helical wrapping. Therefore, a large pitch length corresponds to a small pitch angle, and a small pitch length corresponds to a large pitch angle or angles inclination (see also FIGS. 1 and 2).

For purposes of stretching, it was advisable to use a cross-linked strand and have it paid from a suitable storage drum. This strand is then looped around a second drum in at least one loop and behind that drum a stretching device is provided, which is basically comprised of a heating and a cooling portion. Behind and downstream from the stretch device another auxiliary drum is provided around which the non-stretched and cooled strand is looped again, at least in one loop, and this downstream auxiliary drum is driven at a speed higher than the upstream drum. The stretched strand as it leaves the downstream auxiliary drum is now used as a core and provided with the wrapping, braiding, or the like, such as coiling of a high tensile strength thread as outlined above. Owing to the rules concerning the angles of pitch the re-enforcing wrapping layer may actually be provided already upstream from the stretching. The speed control of the second auxiliary drum is preferably provided in that the diameter of the stretched strand is measured and compared with a particular value as reference value, representing the stretched strand thickness that should obtain at that time. The comparison controls the speed of the downstream drum, or more accurately, the speed relation of upstream and downstream drums. The second auxiliary drum is now supposed to move a little faster or slower in order to obtain the diameter agreement.

A particular advantage obtains if the strand serving as a core is an extruded strand made of polyethylene, grafted with silane, and being (or having been) cross-linked in the presence of moisture or by means of steam. This kind of cross-linking is very advantageous from a point of view of manufacture because it does not require any complex machinery. However, it was found that, if the strand-core is very thin, it might be advisable to use nuclear or other high energy radiation for obtaining the cross-linking.

The core strand made in accordance with the invention and being configured in accordance with the invention are used in heat-recoverable, heat-shrinking ribbons or strips. Such strips may, for example, be used for coveting a joint in electrical cables, conduits, tubing or the like. Such a ribbon is made of a plurality of parallel extending strands of the kind referred to above and being embedded in a thermoplastic layer of polymer. The embedding layer is preferably also extruded onto and around a group of parallelly placed core strands. Alternatively, plural basic core strands of the kind referred to above (strand core with coiled high tensile strength thread) are put in a plane, and this loose assembly is wrapped in ribbon made of thermoplastic polymer, resulting in an embedding layer. As a whole, the assembly is now an areal configuration into which the heat-shrinkable core strands are embedded and integrated. Following the application of the thermoplastic layer this added layer may also be cross-linked in some form.

Owing to the reinforcing wrapping, for each of the now embedded strands, the ribbon has a very high tear strength in direction of shrinking. In order to make sure that there is an adequately high tear strength of the ribbon also transversely to the direction of shrinking, so-called wrap threads can be placed around the group and layer of strands. In accordance with the different solution concerning particular aspects, it is suggested that, at least in one of the ribbons or strips that has been wrapped around the core strand, one provides threads or filaments which have a high tensile strength, even at the heat-recovering and shrinking temperature. These threads extend over the entire width of the ribbon and may be made of the same kind of material suitable to the reinforcement layer for each of the core strands.

In accordance with a preferred feature of practicing the invention such a flat, ribbon-like object is made in that a multiple number of core strands of the type preferred to above, are introduced in parallel into an extruder which uses all of these core strands in a more or less flat core and provides all of them together with a coating of thermoplastic polymer so that the overall configuration of the resulting product is essentially that of a ribbon with rectangular cross-section. The ribbon is then heated above the crystallite melting point of the cross-linked polymer of the strand, stretched in the heated state, and while maintained in the stretched state, it is cooled down again.

There is, however, also the possibility to use the technique mentioned earlier, namely that pre-stretched strand cores with reinforced wrapping are used and a layer is extruded around them in the same manner, whereby, however, in that case one has to take care that the extrusion or any other depositing process does not heat the strand cores to the shrinkage temperature. Still a further possibility of manufacturing a ribbon of the kind mentioned above is that one uses a plurality of core strands placed in a plane, and through threading of filaments a kind of mat or pad is made which then is embedded with a thermoplastic polymer on both sides. The core strands can be stretched or unstretched when so interwoven. In the case of unstretched core strands the resulting ribbon is stretched after the coating. Coating is to be understood in the general sense and maybe provided either through extrusion or through ribbon wrapping and melting.

The inventive principle is also applicable for the making of heat-shrinking ribbon-like objects of a synthetic material wherein heat-shrinkable strands of cross-linked materials, and having a reinforcing wrapping, is embedded in-between two layers of a thermoplastic material. In this case then, one uses a plurality of parallel positioned individual core strands, as defined and being arranged in more or less a common plane and being embedded in a continuous process of applying thermoplastic synthetic material to both sides of the group of parallelly arranged core strands to obtain an embedment made of the thermoplastic synthetic. In-between the layer of core strands, and at least one of the wrapping ribbons, a further layer is placed, in the general sense, made of threads which have a high tear strength, including high tensile strengths at the heat-shrinking temperature of the individual core strands mentioned earlier.

A particular advantage of this mode of practicing the invention, is to be seen in that the layer core strands can be lined directly following the stretching, and without weaving. The tear strength of the ribbon is increased through the particular embedded layer made of very strong threads having a high tear strength. This will be developed more fully below.

Increasing the tear strength of the ribbon as a whole in shrinking direction as well as transversely thereto, obtains by providing a high tensile strength core layer as a kind of mesh. Using this mesh is of advantage because, in the case of lining, as mentioned earlier, the plasticized synthetic of the lining will pass through the openings in the mesh and can be welded with the individual threads or causing them in fact to be welded together while being in the plastic state. The tear strength of the ribbons or strips transversely to the direction of shrinkage can also be increased by including an individual thread of very strong material in a meander pattern around the group of core strands, prior to the bedding process. Still alternatively, an individual thread of high strength material maybe looped helically around the various threads of the original configuration. This last mentioned approach is advisable to pursue since the stretched individual strands serve respectively as cores in a wrapped around configuration, using a highly strong material. This spinning or wrapping the individual core strands does not interfere with a shrinkage, while, on the other hand, the tear strength of the individual thread so lined is drastically increased.

There is another possibility in that the individual stretched strand cores are, in effect, made through the stranding of threads, whereby the stranded bundle includes heat-shrinkable as well as not-heat-shrinkable fibres of high tensile strength. On shrinking, the pitch length as defined above of the stranding bundle is reduced, but the shrinkage will not be interfered with through this heating. The highly strong threads or filaments in the bundled strand are not amenable to heat-shrinkage in this bundle; they do, however, increase the tensile strength of the assembly, i.e. of the visually core strand, to a considerable extent.

Highly strong threads within the context of this application are to be those which, on reaching shrinkage temperature of companion strands, have a much larger tear strength and tensile strength than the synthetic material threads permitted to shrink. Some of the highly strong threads were already mentioned and should be repeated here that what is envisioned here, includes glass and other ceramic fibers, metal fibers in wire-like configurations, cotton threads, polyester or polyamide threads filaments, etc. These highly strong individual threads or filaments may be coated with a thermoplastic lining.

The strand cores of a cross-linked synthetic should be coated in a thermoplastic cover. That cover establishes a good bond, for example, through welding, to the ribbons or strips or tapes of thermoplastic material which, in some form or another, are wrapped around the assembly or is used as outer lining. The thermoplastic cover of each strand avoids heating of the individually stretched core region during that welding so that the core temperature will not be raised above the shrinkage temperature. The resulting strip, ribbon, or the like, will preferably be cross-linked subsequently, for example, through high power nuclear or other high energy radiation.

In accordance with the further feature, it is suggested to provide at first a mat or a mesh from crossing threads made of a material which is not subject to stretching, or to a very minimal extent, whereby particular those strands running in one particular direction are configured in a helix, and this mat, mesh, or the like, will then be embedded in a stretchable synthetic host material in order to obtain a ribbon which then is stretched in the direction of the helically coiled.

A considerable advantage of the invention when practiced in this fashion is to be seen in that something analogous to ribbons of the German Patent No. 15 25 815, obtain. These ribbons are established as a heat-shrinkable matrix of synthetic material, but unlike the prior art a mesh or the like is used presently to reinforce the heat-shrinkable embedment and possible any core strands themselves. The mesh itself has a kind of spare tension range owing to the helical configuration of threads therein, even if that material is not subject to extension. Still, the resulting ribbon with embeded mesh can be stretched at degrees of 400% and even more. On stretching, the pitch length of the helical as defined above, is increased and the diameter of the helix decreases. There is, of course, an extreme or limit case where the helix, in fact, becomes a straight thread. Following the shrinking of the embedment, the thread will assume a rather irregular contour and configuration inside the matrix of the recorded synthetic material, if the helices are not wound on shrinkable and shrinking core strands.

It is of particular advantage if each of the high tensile strength thread configured as a helix, is, in fact, helically wrapped or wound around, a synthetic strand cores of any kind of cross-section and being stretchable or not. This way one can provide a shape stable mat or mesh which then can be taken from the supply spool without deforming the mesh openings in terms of linear dimension, and that mesh or mat is then fed to an embedding equipment. In accordance with a particular feature of the invention the synthetic material of the ribbon following the embedding is cross-linked heated, stretched in the heated state, and cooled while still in the stretched state. On re-heating the synthetic strand core softens (it is not stretchable) as it carries the helical thread and then follows the stretching process, whereby the helix provides for the requisite deformation range.

The embedding of the mat or mesh in synthetic material is carried out through extruding, laminating lining or ribbon wrapping. Here it is essential again that the synthetic material penetrates the gaps or spaces in-between the thread of the mesh or threading so that, in fact, a single layer ribbon-like strip obtains, having an embedded reinforcement layer. The synthetic core upon which thread is helically wound, is preferably made of a thermoplastic non-cross-linked synthetic which makes sure that the embedding matrix, likewise being thermoplastic and not yet cross-linked, can bond with the strand material in intimate fashion.

In furtherance of the invention, the mesh or the like is made in a continuous process, whereby specifically silane grafted polyethylene is extruded around the mat or mesh of reinforcing threads. The polyethylene is then cross-linked as far as the silane grafting is concerned in the presence of moisture or stem. The cross-linked ribbon is then heated to a temperature above the crystallite melting point of polyethylene and at that temperature the material is stretched by at least 40%, possibly up to 400%, and cooled while maintaining the stretching state. This being the preferred form of practicing this aspect of the invention, other ways of cross-linking can be used such as radiation or peroxide cross-linking. The cross-linking of silane grafted polyethylene under utilization of just water as the cross-linking agent is clearly preferred because it is so simple.

It is, moreover, suggested to provide a more or less endless mat or the like, under utilization of warp and weft threads, whereby the one kind (warp) runs straight and is made essentially of non-stretchable material while the other threads are core strands made of a thermoplastic synthetic core with a helical wrapping, using one or more threads, also being made of a non-stretchable material. There is, of course, a certain yield possible owing to the helical wrapping. The mat or mesh is then continuously embedded in a synthetic matrix material which is then cross-linked, following which certain shapes or length are simply cut from this more or less endless ribbon or strip, which individual shapes are now heated, stretched, and cooled in the third state.

The material for the non-stretchable strands or threads are again, for example, cotton, metal wire, fiber, glass threads or the like. They may be individual threads or stranded together or intertwined or plied in various ways. It is also possible to thread several threads upon the synthetic core, whereby it is specifically conceivable that there is a combination of the materials used, selected from those outlined above.

In the case of a silane grafted polyethylene being the synthetic material to serve as the embedding material matrix then preferably the thread carrying the helical strength, either being non-stretchable, while the carrier thread is also made of polyethylene.

In accordance with a further configuration of the invention, and as a refinement it is suggested to crosslink the ribbon different degree over its cross-section. Particularly the wall portions of the ribbon facing or which are going to face the object to be wrapped, will have a higher degree of cross-linking such as 25 or 50% as compared with those ribbon portions facing away, where a lesser degree of cross-linking below 25%, even as low as 5%, may suffice. Tests have shown there is a general propensity to tear; hence the probability that a ribbon may tear or rupture does indeed increase with the degree of cross-linking. Owing to the non-uniformity in the cross-linking those portions which are particularly prone to cracking, will have a lesser degree of cross-linking. This makes the strip or ribbon or tape as a whole less prone to tearing.

The twin layer ribbon is preferably made through the co-extrusion of two layers, and in order to obtain this different cross-section, one provides one layer with a smaller number of silane graftings. This way then one will inherently obtain a reduced cross-linking following a uniform exposure to moisture. Exposure to moisture, may, for example, simply be just by storage in a humid and moist environment. In either case, there will be a lesser degree in cross-linking of the silane in one layer simply because there is less silane that can cross-link. One can also control the degree of cross-linking through differences in the adding of cross-linking agents and/or catalysts. In either case different degrees of cross-linking obtains. The final ribbon has a sandwich construction which, moreover, has an increased tear strength as compared with homogeneous single layered kind of ribbon, as a double layer sandwich configuration with a different degree of cross-linking shows, in fact, a kind of mechanical synergism.

It was already mentioned that it is necessary to bond the particular two sides of the ribbon layers that face the mesh or web to each other through the openings of the mesh. If the mesh width and opening size, i.e. the inherent porosity of the mesh or mat, is too small, difficulties may arise, particularly if the synthetic material being rather viscous, does not penetrate the openings of the mesh. This problem is solved in that the wrapped around synthetic strands are, in fact, more interwoven with different distances. For example, two or three synthetic strands are provided with a relatively small distance in relation to each other and these groups of two or three strands are then placed at a larger spacing. This pattern is, of course, observed in both directions, so that the spacing from group to group is visibly larger so that, indeed, synthetic material can with ease penetrate to these openings.

DESCRIPTION OF THE DRAWINGS

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

FIG. 1 is a side view of a core strand in accordance with the preferred embodiment of the present invention for practicing the best mode thereof, showing the stretched state;

FIG. 2 shows the same strand in a shrunken or heat-recovered state;

FIG. 3 is a schematic side view showing the manufacture of the core strand with wrapping as shown in FIGS. 1 and 2;

FIG. 4 is a cross-section through an open sleeve made in accordance with the teaching of the present invention;

FIGS. 8, 9, and 10 are isometric views of a sleeve, made in accordance with the invention;

FIGS. 12 and 13 are isometric views, partially in sections, partially with peeled away layer portions, of a heat-recoverable ribbon mat configuration made in accordance with the preferred embodiment for practicing of the best mode of the invention;

DETAILED DESCRIPTION OF THE DRAWINGS

Figure 5:
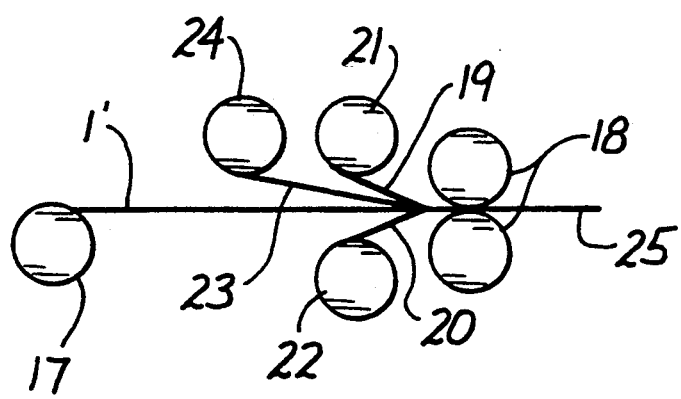
FIGS. 5 and 6 are schematic showing for demonstrating utilization of core strands in accordance with the present invention, particularly those made in accordance with FIGS. 1 and 2.

FIG. 1 illustrates a core strand 1 in accordance with the preferred embodiment of the present invention being shown to have been placed in the stretch state. The core strand 1 consists of a core proper or strand core 2, made of a thermoplastic or a cross-linked synthetic material, preferably, but not exclusively, it is a polyethylene strand which is grafted with silane. A thread or ribbon 3 is wrapped helically upon the core 2. The thread or ribbon 3 is comprised of a material which is still strong at the shrinkage temperature of the core 2; in other words the tensile strength of the helical wrapping 3 is considerably larger than the tensile strength of the core 2 at a temperature in a range from 130° C. to 150° C. Preferably, the thread or ribbon 3 is made of a strong synthetic such as polyester, polyamide, or cotton fiber, cotton thread, a metal wire, ceramic thread, glass filament or thread or the like. The thread is either stranded, intertwined/played, braided or otherwise comprised of a multitude of thin but combined threads. This includes, of course, combining threads in a weaving or the like configuration, so that 3 actually is a ribbon. The multi filament configuration of the thread or ribbon 3 permits inter alia utilization of different materials for weft and warp in order to optimize the various properties involved.

The core 2 is shown as a single strand but it could be a bundle made of thin individual thermoplastic and/or cross-linked synthetic fibers which are, again, are stranded, braided, or otherwise intertwined and combined. By way of example, the core 2 may be comprised of cross-linked polymers which are intertwined, braided, stranded or the like, together with threads of a rather elastic material, including natural or synthetic caoutchouc. A combination of individual threads is also conceivable wherein cross-linked shrinkable polymer threads are combined with non-shrinkable threads, and still the core 2 will remain shrinkable as a whole.

It is essential for the combination, i.e. for the making of the core 2, that the individual threads are combined with each other at a particular pitch length which is changed, i.e. enlarged or diminished, on stretching and shrinking, respectively. The cross-section of the core strand, including the core 2 as a whole, and/or the individual threads of which the core is composed, can be as suitable under the circumstances and as necessary for the purpose of this particular elongated construction. The threads maybe round, i.e. may have a round cross-section or oval, circular, rectangular, triangular, trapezoidal, or other polygonal cross-section.

If the core 2 is made of a cross-linked polyethylene then between the core 2, on one hand, and the thread and ribbon 3, on the other hand, may, as is shown in the right-hand portion of the FIG. 2 be provided with another layer 2a which maybe co-extruded with the core 2, or results from extruding material onto a fiber bundle of which such a core 2 maybe composed. This layer 2a generally should not be of a cross-linked material. It may, preferably, be comprised of a noncrosslinked polyolefin, polyamide, polytetrafluoroethylene or the like. The purpose of this layer is to make the core strand 1 as a whole resistant against flames, acid or other dangers. A layer 2a, for example, of a non-cross-linked polyolefin would yield advantages on further working and use, because such a layer offers the possibility to weld multiple of such strands together or to weld them together with a synthetic ribbon or to combine and bond the various layers in ribbons to each other. Particularly in order to permit fibers and to bond with any embedments, wrapping, lining or the like.

FIG. 2 illustrates the core strand 1 in the shrunken heat-recovered state. It can readily be seen, particularly from the cross-sectional dimensions, that the diameter, for example, of the core 2, has increased owing to reduction in length, which, of course, is not visible in the section of the drawing. On the other hand, the pitch length of the thread 3 has decreased, the pitch angle is increased.

FIG. 3 illustrates the manufacture of this kind of core strand. Assuming that a core 2 of material comes wrapped on a supply spool or drum 4, that core is drawn therefrom and passes through the illustrated processing stages, while on completion it is wound again onto another supply spool or drum 5. The core 2 maybe a single solid core element or may be composed of stranded or the like individual fibres, and possibly be stranded in a multiple hierarchical fashion. The core 2 is passed in one or two loops around a small drum or roller 6, and is fed to a stretching device 7, which is basically a heating device by means of which the core 2 is heated to a temperature above its crystallite melting point. Following the heating, it is cooled. Somewhere within the heating zone the core 2 is stretched; for this a second drum or roller 8 is provided, and again the now stretched core 2 is run in at least one loop around drum or roller 8.

The drum 6 is driven by a motor 6a, and the drum 8 or roller 8 is driven by a motor 8a. Through a common control a particular speed differential is maintained such that the drum or roller 8, runs faster. This makes sure that the core material 2 is removed in longitudinal direction from the device and station 7 faster than it is fed into this device 7, and the speed differential is, of course, directly effective for causing the core 2 to stretch in the heating device 7. The stretching is effective in zones that have the maximum temperature.

Another way of obtaining a speed differential is driving both drums or rollers 6 and 8 from a common motor but the diameter of drum or roller 8 is larger so that its linear speed on the periphery is larger, accordingly. Reference numeral 9 refers to a transducer which measures the diameter of the stretched core 2. This diameter value is compared in the control device with the diameter of the un-stretched core, which is simply a reference value. Depending upon the results of the comparison, the rotational speed of the drum 8 is controlled. Obviously, one is stuck with a fixed relationship if the diameters are different, but both drums or rollers 6 and 8 are driven at the same rotational speed from the same motor.

Reference numeral 10 refers to a cop-spinner which wraps high tensile strength strip or ribbon 3 unto this core 2. This way one obtains a configuration described above with reference to FIG. 1. Thereafter, the core 2 with wrapping, constitutes what is called here the core strand and is wound onto the spool or drum 5. It should be mentioned that the thread or ribbon 3 could be wound in a smaller pitch than the one shown in FIG. 1 if wrapped around the core 2 upstream from the stretching device 7 and the stretching then, of course, changes the pitch of the wrapping 3.

Proceeding now to the description of FIGS. 4 through 8, there are shown flat strip or ribbon-like objects made and processed in conjunction and with the aid of further utilization of core strands of the kind shown in FIGS. 1 and 2. FIG. 4 illustrates an open sleeve which, in more or less short configuration, is used for wrapping around a cable or tube joint; the cable and tubes to be joined abut in intimate relationship and this particular open sleeve is then wrapped around the joint area and the two end portions of the cable or tube.

A particular open sleeve has two longitudinal bars or ridges 11 and 12 which have sides 12a and 11a that will, following wrapping around on a tubular joint, directly abut. Next a rail or C-shaped bar in form of a split tube or the like will be slipped over the two longitudinal ridges 11 and 12 to, so to speak, close the split tube. In addition, the bars and ridges 11 and 12 serve as force attack points for use on stretching.

The particular open sleeve is, as can be seen, of multi-layer construction. It includes an upper layer 13, an intermediate layer 14, and a lower layer 15. They are bonded together through depositing and heating or co-extrusion or the like, so as to obtain a uniform configuration. The layer 13 includes the longitudinal ridges 11 and 12, and is made of a thermoplastic polymer such as polyethylene. The layer 14 is essentially comprised of a mat configuration which is woven, intermeshed, or made by otherwise combining fibres or threads, each being comprised of a core strand shown in FIGS. 1 and 2.

The core strands of which layer 14 is composed, runs particularly transversely to the direction of extension of the longitudinal bars or ridges 11 and 12. These core strands are preferably combined through transverse threads extending parallel to the ridges, and, so to speak, being interwoven with the core strands. The dots 16 illustrate these. In a different kind of configuration, the mat of layer 14 is comprised of a single long core strand, being put in a meandering configuration, and which, in turn, is embedded particularly in the direction of meandering extension in the thermoplastic synthetic. In either case or in the case of the threading, particular high tensile strength threads 16 are embedded in the layer 14, which extend in longitudinal direction, and increase the stability and tear strength of the sleeve as a whole, particularly in what will be the axial direction.

The layer 15 is also a thermoplastic polymer, for example, polyethylene, and there may be high tensile strength threads embedded in the layer 15 also running longitudinally in direction of the ridges 11 and 12. Aside from these layers 13, 14, and 16, individually, they maybe, i.e. deposited superimposing one on top of each other through co-extrusion. In this case, of course, the mat that is embedded in layer 14 will be separately provided and is embedded in a thermoplastic material, which means that in FIG. 4 the layers 13 and 15 would have to be combined separately at their edges, which is not shown, wrapping around and gripping over or reaching beyond the mat of layer 14, so that directly the abutting portion of the layers 13 and 15 permit physical contact and interconnection. The entire arrangement in the vicinity of the bars and ridges 11 and 12 will then be cross-linked, for example, through radiation. If the individual strands of which the various parts in the sleeves are composed, are not yet stretched, then the co-extruded or otherwise laminated open sleeve can be stretched as a whole, permitting heat recovering as described.

FIG. 5 illustrates a plurality of core strands of the kind shown in FIGS. 1 and 2, and they are wound and looped onto a drum 17, and are paid so that 1' in FIG. 5 is actually a layer of parallel running core strands of the kind shown in FIGS. 1 and 2, extending in a plane transverse to the plane of the drawing. The different strands may be arranged on different drums.

Numerous core strands 1 forming layer 1' will be basically passed through two rollers or rolls 18, and the rolling gaps. Two ribbons 19 and 20, respectively, paid from supply spools or drums 21 and 22, are run also the rolls 18 on opposite sides from the core strands 1'. All these strands will now be embedded in-between two juxtaposed layers of the ribbons 19 and 20, by operation of the rollers 18. A particular thread or mesh 23, paid from a spool 24, is interposed between the ribbon 19 and the strands 1'. It is assumed that the various core strands 1' are already stretched, which means that the resulting compound ribbon 25 as a whole is heat-recoverable.

FIG. 12 now shows a ribbon made basically as shown in FIG. 5. Here then one can see the lower synthetic ribbon 20 serving as a base upon which are placed the plurality of parallel placed individual core strands 1, and it is assumed in this case that they are all pre-stretched. Alternatively, these strands 1 can all be embedded in the ribbon 20. Covered are these threads 1 by the mesh 23 and on top of the latter mesh is placed the ribbon 19.

Figure 6:
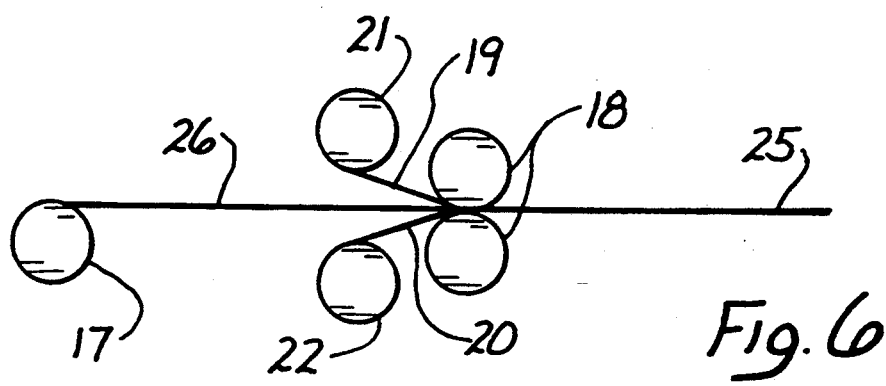

A different kind of arrangement and ribbon making method is illustrated in FIG. 6. From the spool 17' a mat 26 is paid. This mat includes a plurality of parallel running core strands 1 which have already been stretched, and transverse threads combine the strands 1 to a mat. The transverse threads of the mesh 26 have a high tensile strength (glass fibres, polyamide, etc.). This particular mat 26 is passed again into the gap of the tools 18 which combine and embed the mat 26 between the two ribbons 19 and 20. The resulting flat object is also a compound strip or ribbon 25 which can actually be made in this manner in a near endless fashion. Decisive is that the ribbon as a whole is heat-recoverable because its major component are the core strands which have been pre-stretched and which form the heat-recoverable elements within the mat 26. The strip or ribbon 25 can actually be produced in a more or less endless fashion.

If the high strength mesh 23 of FIG. 5 is not used or if the high tensile strength thread in the mat 26, as per FIG. 6, is not employed, then the method can be modified in that the core strands 1 included in the plurality 1' are not yet stretched at all, and then the assembly of form strands 1' embedded and sandwiched in-between layers and strips or ribbons 19 and 20, are then stretched as a whole.

Figure 7:
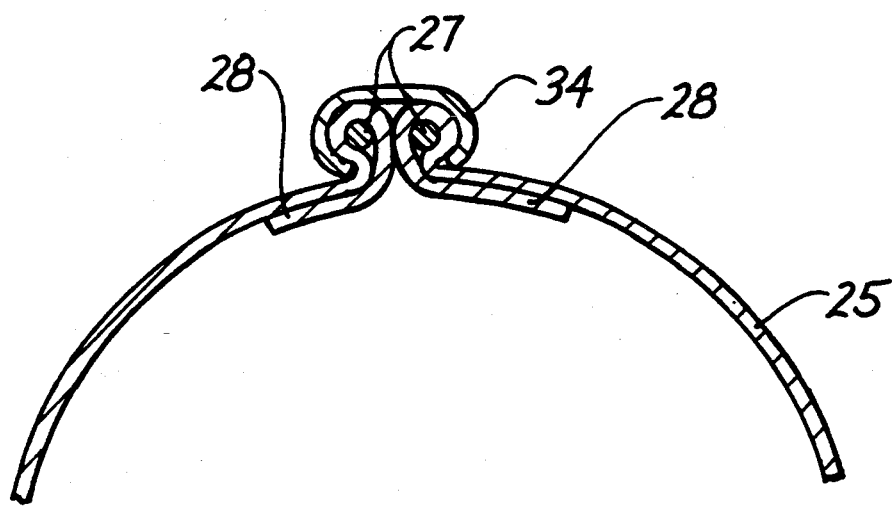
FIGS. 7 and 11 are cross-sections through respective portions of sleeves to be used for cable or tubular joints.

FIG. 7 illustrates a wrapping, cover, sleeve, envelope or the like for a cable or tubular joint, and here it is assumed that a particular length has to be cut from the strip 25 either made as per FIG. 5 or FIG. 6, or in the modified version as described. The closure element is a C-shaped rail 34 which holds the ends of the ribbon 25 together. The ends of the ribbon 25 loop around and double back a flexible rod 27. The double-backed portions are welded where shown by numeral 28.

In the case of FIG. 8, two rods 27 and 27' are provided, and it is assumed that a particular long core strand 1 is spun in a particular pitch around these two rods 27 and 27', in a kind of multiple intertwined helix and runs back and forth. The thus established configuration can then be embedded in a thermoplastic layer, for example by being sandwiched in-between two strips or ribbons such as 19 and 20, as shown in FIGS. 5 and 6, or there may be a configuration, which as a whole, is filled by extrusion. The core strand 1 may have been in the stretched state when wrapped around the rods 27 so that following the embedment and covering with a synthetic layer the particular configuration is complete. On the other hand, it can readily be seen that, if the core strand 1 that has been wound around the rods 27, is not yet stretched, then stretching may obtain after the configuration is embedded in the synthetic layer.

FIGS. 9 and 9a illustrate an example wherein either a stretched or an un-stretched core strand 1 is placed in-between two rod halves 27a and 27b. The rod is, in effect, split in longitudinal direction and the strand 1 is particularly looped around one of the rows of ridges 29. These ridges are later inserted in a groove of rod portion 27b. The core strand 1 is looped around the ridges 29 and then looped around ridges in a rod or the other end, and in a back and forth fashion. After the strand has been looped around, all the ridges 29, the ones illustrated, and these other rod halves to the right of the drawing, have their respective other mating halves 27b slipped onto 27a or clipped these on and bolted or otherwise bonded or secured thereto. This assembly of a support rod pair, each composed of two halves, and of a strand running back and forth in-between, will be embedded in a polymer by extrusion or sandwiched in-between synthetic material layers and this may obtain before or after stretching. The particular configuration shown in FIG. 9 has the advantage that all stringers of the one strand are situated in one particular plane, and there is no meandering looping back and forth as in FIG. 8.

Figure 11:
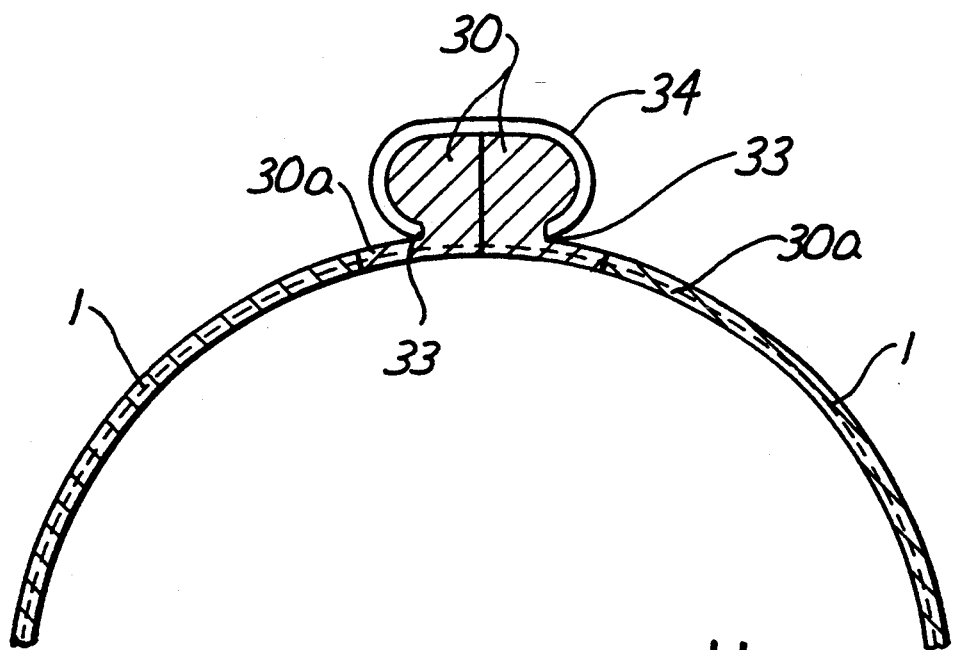

The situation is quite similar in the example shown in FIG. 10. Here flat rods 30, have a similar cross-section with an added on ridge 30a. A plurality of grooves 31 are provided in the rod 30. Owing to these grooves, individual blocks or extensions 32 are formed, and here the strand 1 is inserted, looped to the back, and back around the respective rod and again returned to the next groove towards the ridge and the assembly 30 and 30a at the other end, and so forth. A longitudinal groove 33 is provided, as a kind of undercut for the ridges 30a to the strands 1 and parallel to the axis of the sleeve. The configuration is made into a sleeve as shown in FIG. 11. A C-shaped connective element 34 is slipped into these grooves as shown in FIG. 11.

FIG. 13 shows another ribbon configuration. Again, a plurality of threads or core strands 1 are placed on a substrate ribbon, and they, in turn, are covered by the layer or ribbon 19. Now, instead of the mesh 23, as shown in FIG. 12, FIG. 13 provides a single thread 35 made of cotton, metal, wire, glass, fibre, or any other typical high strength synthetic such as a polyamide or the like. That thread is helically looped around the core strands 1, which are all placed in one plane, and one can see readily the configuration of this particular looping.

A ribbon made in this fashion is very suitable as a ribbon, strip or the like, for purposes of being wrapped around objects, having, for example, differences in diameter. This holds also true for the ribbon shown in FIG. 12. A particular and preferred field of application is the moisture tight and sealed wrapping of cable and-/or tubular joints and connections. For manufacturing such a joint or connection a certain length of this strip is taken from the spool on which it is stored and is looped and wrapped around the joint, and then the ends are mechanically interconnected. For example, a soft flame heats the ribbon and tape 25 until shrinking begins. Owing to the multi-laminated layer the outer layer of this strip, which has ultimately resulted from the ribbon 20 or 19, then the strands 1 shrink, and the ribbon 25 is now forced fight onto the joint area.

The surface of this ribbon 25 facing the joint maybe covered with an adhesive or a sealer or the like to make sure that the sealing is fight against the joint area. If the filaments or threads 3 on 35 are made of metal, or if in the case of stranding, there is a particular strand included that is made of metal within the stranded compound; then the heating for purposes of shrinking can simply be obtained by running an electric current through that metal filament and the heat resistance losses provide a very controlled heating up to the recovery and shrinking temperature.

Figure 14:
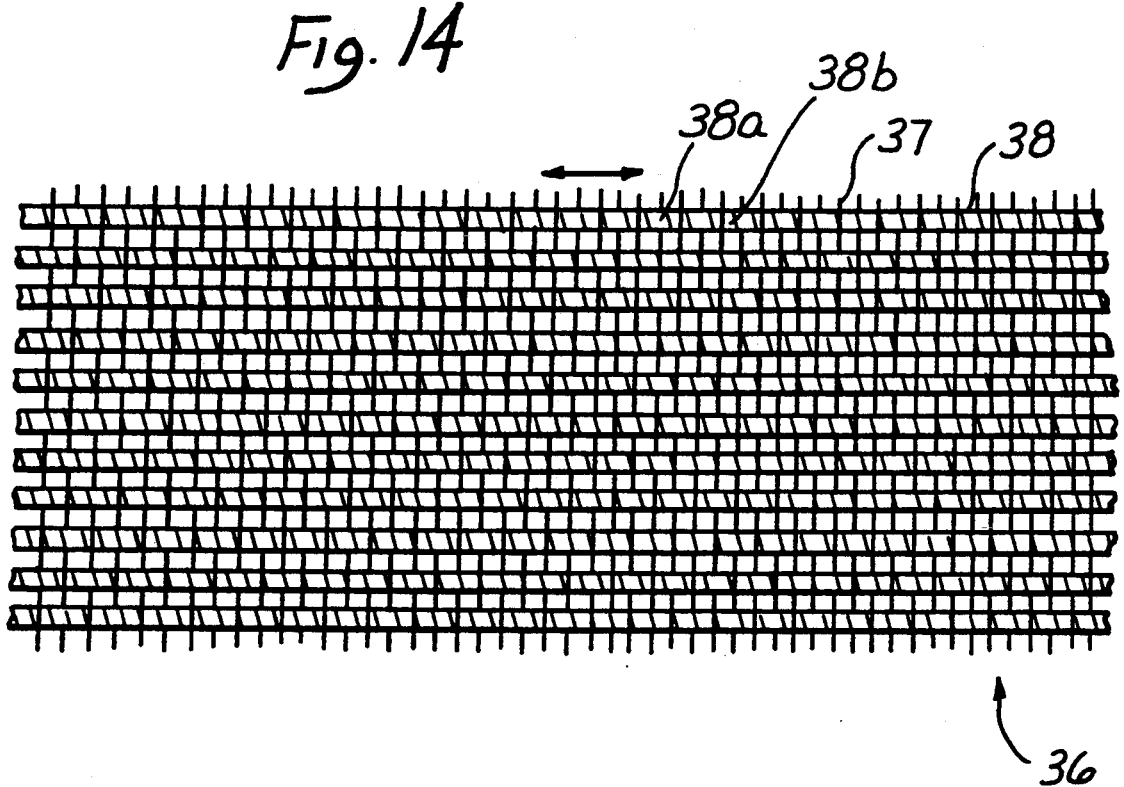
FIG. 14 shows a particular re-enforcing mat or mesh in top view.

FIG. 14 shows in greater detail a particular mat or mesh 36, for practicing a different aspect of the invention. This mat or mesh configured from crossing threads 37 and 38. The threads 38 include a polyethylene strand 38a upon which is wound in a helical fashion strand 38b made of a different material. The strand 38 actually corresponds to core strand 1 in FIGS. 1,2 etc. and having a core proper or strand core 38a and a coiled wrapping 38b which is similar to the wrapping 3. The threads 37 and 38b are preferably made of a non-stretchable material such as glass, cotton, metal or the like. Of particular advantage is the utilization of multiple plied or intertwined glass filaments to be used as threads 37 and 38b. Owing to the helical wrapping of 38b around core 38a the two can extend together when the assembly is stretched and thus has an extension reserve or excess length available. On extension of the strands in the diameter of the core 38a decreases and, therefore, the inner diameter or the helix resulting from the wrapping of the threads, filaments, etc., 38b decreases correspondingly. That, of course, permits increases in the pitch length. In an extreme case threads 38b and cores 38a run parallel to each other. While the spacing of the thread 37 transverse to their extension is correspondingly increased by the stretch factor. It can readily be seen that such a particular mesh or weave can be made in a normal weaving machine.

Figure 15:
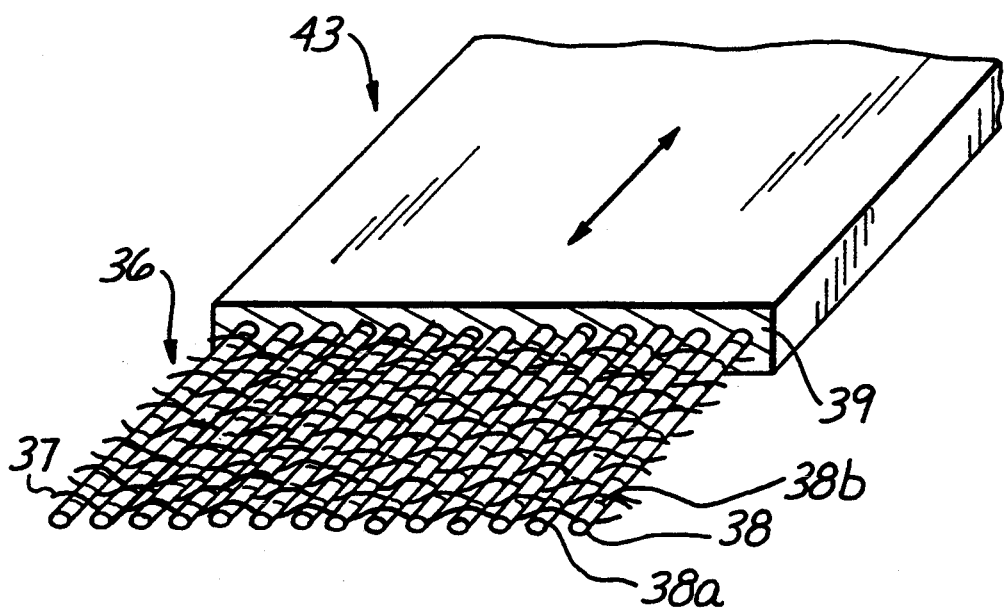
FIG. 15 shows the embedment in an isometric and partially cut away view of the mat shown in FIG. 14.

As shown in FIG. 15 a mesh or weave 36 will be continuously embedded into a synthetic matrix such as 39 in FIG. 15. For making such a ribbon or strip or tape one proceeds as follows. First, the synthetic core strands 38a are extruded and after cooling a multiple glass fibre threads 38b are looped around the core strands 38a with relatively short pitch lengths. By way of example, 38a maybe polyethylene thread filaments with a diameter of 1 mm, while 38b is a glass fibre of 0.05 mm and wrapped onto 38a at a pitch length of 1 mm. The assembly 38 resulting from 38b and and 38a is, in fact, stretchable by a factor of 4 maximum. The core strands 38 will be used as a weft in a weaving machine and combined with a warp such as glass fibres 37. The glass fibres 37 may have a diameter of about 0.05 mm and one obtains a particular mesh.

Figure 16:
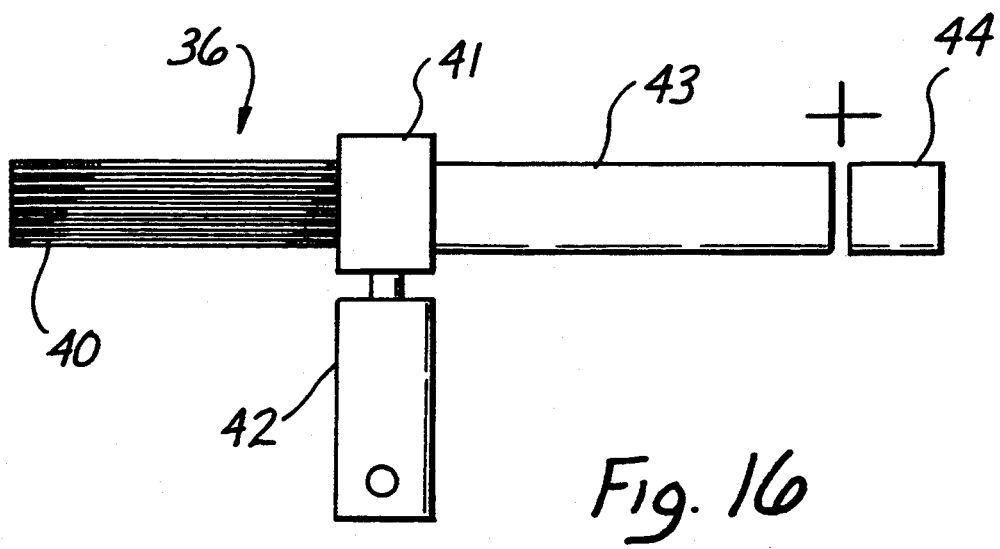
FIG. 16 shows the ribbon making process, in a top view.

The mesh 36 is also shown in FIG. 16. It is taken from a drum in a continuous process and passed into a transverse extrusion head 41 of an extruder 42, and is embedded in a synthetic matrix layer 39. The resulting ribbon 43 is then cut into partial lengths and strip portions 44, as indicated, and these individual pieces are now stretchable transversely to the direction of extrusion. The synthetic matrix 39 is preferably made in 50 parts by weight polyethylene, 40 parts by weight ethylene-vinylacetate-copolymer, and 10 parts by weight of soot or carbon black. This blend is made into granulates, and the granulates are mixed with about 1% by weight of vinylmetoxisilane and charged into the hopper funnel feeding the extruder 42. The granulate is extruded in order to provide the layer 39, embedding the mesh 36 in a strip of 4 mm thickness.

In the case of a multi laminated configuration, the strip can be made through co-extrusion of two layers and these two layers are embed the mesh 36 in-between themselves. Here then comes into play what has been mentioned in the introduction. Different sides of the strip may have (or should have) different degrees of cross-linking. One may, for example, reduce the relative portion of the vinylmetoxisilane in one of the layers, for example, down from the 1% to half or even to one tenth of 1% by weight. The separated piece 44 is then exposed to steam at 95° centigrade to obtain cross-linking. It is basically immaterial whether cross-linking succeeds or precedes the cutting of pieces 44 from the endless strip 43. The intermediate products 44 being then cross-linked under the provision that possible different sizes of workpieces are cross-linked to a different degree. They will be placed into a stretch frame for stretching the piece to a factor of 4. The stretching is carried out at a temperature between 120° and 150° centigrade, whereby specifically the synthetic core string 38a in each instance is softened, and subject to the stretching and reduces its cross-section accordingly. The change in configuration of the helix 38b is not interfered with in any manner whatsoever. The stretch strip then has a thickness of about 1 mm. Thereafter the stretched the strip is cooled down to room temperature in the stretch state and is now useful and can be used to recover and re-shrink.

Figure 17:
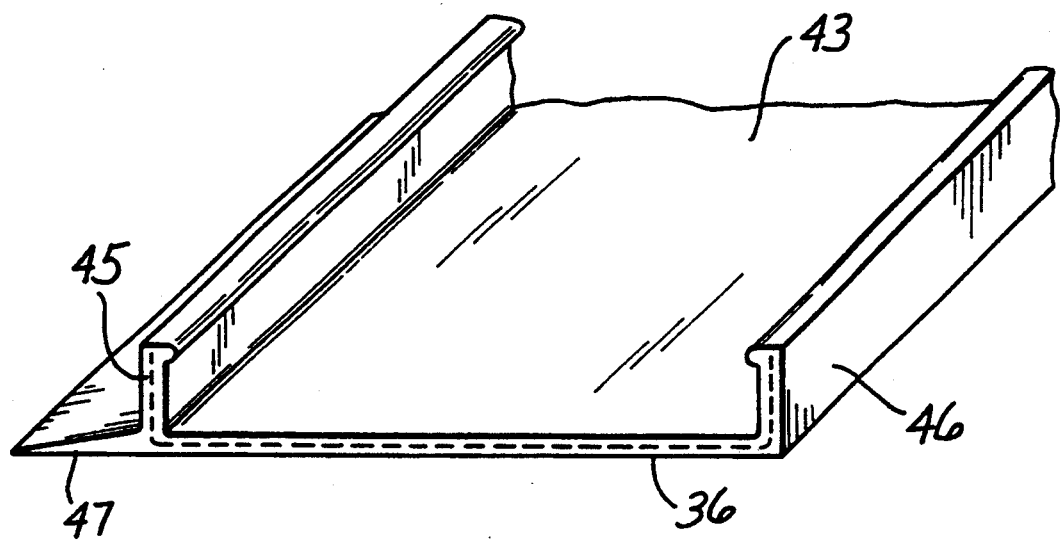
FIG. 17 shows a top view of creating a strip and ribbon made in accordance with the preferred embodiment of the present invention.
Figure 18:
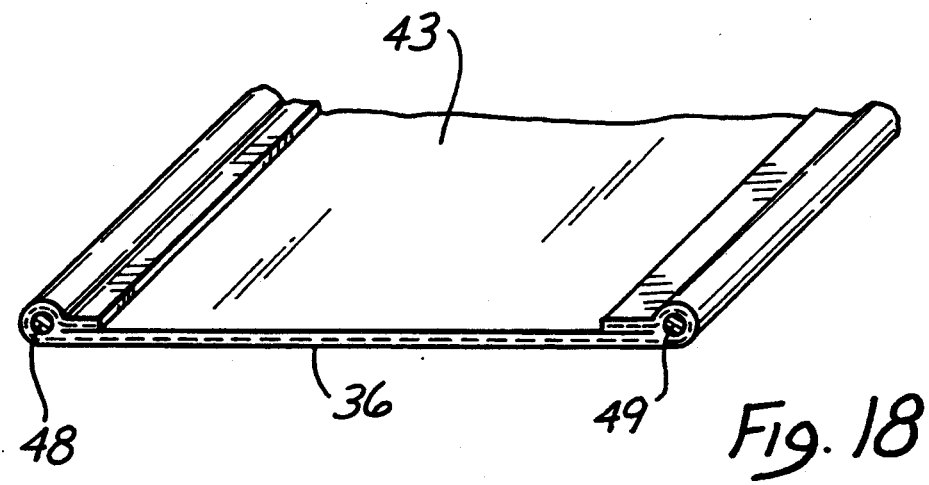
FIGS. 18 and 19 are cross-sections partially in isometric view configuration of various sleeves that can be made to incorporate the features of the present invention.
Figure 19:
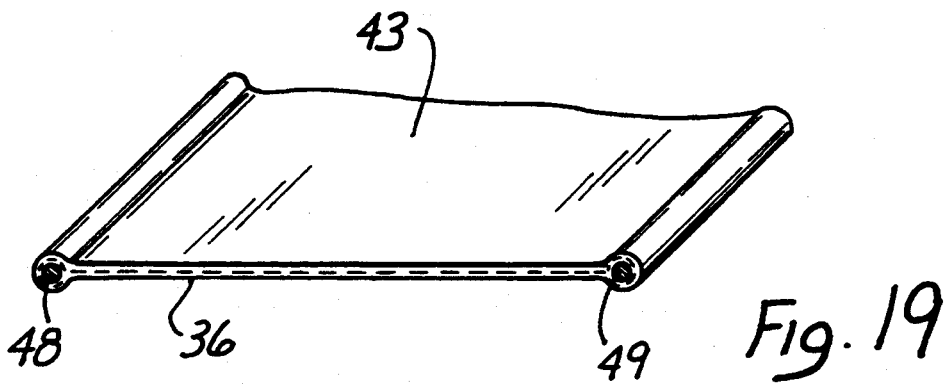

FIGS. 17 through 19 show various sleeves for purposes of obtaining connections and joints. Particular FIG. 17 has basically a configuration that resembles the configuration of FIG. 4, and is used for completing a sleeve for cable splicing. The strip or ribbon portion 43 has two longitudinal ridges 45 and 46, and a tongue or the like 47 extends beyond the bar or ridge 45. This particular configuration is wrapped around the splice connection. The tongue is slipped under the ridge 46, while the respective outer surfaces of ridges 45 and 46 will now abut, and a rail or C-shaped bar is slipped on top of them just as is shown in FIGS. 7 and 11. The curved and bent ribbon 43 is, in effect, forced into and maintained in a tubular configuration. For sealing the sleeve a bonding layer may be provided on the surface contact the splice area which, as per the perspective drawing of FIG. 17, is the downwardly facing surface of this sleeve. That surface will abut the part to be spliced and connected. The bonding layer then is used to bond the sleeve to the substrate tubes. The bonding may obtain when on heating the configuration, shrinkage obtains.

The particular sleeve configuration shown in FIG. 17 differs from the known sleeve as per German Patent No. 15 25 815 in that in FIG. 17 one can clearly see that a mesh 36 is included in the main strip portion 43. This particular mesh 36 is continued into ridges 45 and 46 as schematically indicated. Mesh 36 is extremely important because it increases the tear strength and the pressure resistant of the tape portion 43 when shrinkage temperature has been reached.

FIG. 18 shows the different example of wrapping sleeves. The strip 43 has its end portion formed into loops around flexible rods 48 and 49, respectively. These rods are maybe stranded or otherwise intertwined glass fibres. Rods 48 and 49 will be gripped by means of a C-shaped rail mentioned above (see also FIGS. 7 and 11) which grips both of the rods after the particular open sleeve has been looped around a splice or connection area. The loops are bonded to each other after they have been looped around the rods, through sewing, clamping or the like. This looping may occur immediately after extruding of the ribbon 43 because at that point the overlapping portions and abutting portions of this strip ends are not completely or not at all cross-linked, and can readily adhere to each other. It can readily be seen that the mesh 36 does not only extend through the basic body area 43 of the strip, but also to the loop portion, and, therefore, participate in the looping of the rods 48 and 49.

Finally, looking at FIG. 19, ends of strip 43 re-looped around the rods 48 and 49. This configuration is preferably made in that the edges of the mesh 36 are looped around 48 and 49 under formation of a loop prior to embedment, and the abutting part portions of the mesh 36 following the looping are, for example, sewn to each other in a typical hemming kind of operation. Subsequently, this configuration is then passed through an extruder and embedded in a synthetic extrulite.

In this case the rods 48 and 49 have the same purpose, as described in the various corresponding elements above, namely following placing this particular configuration around a splice area, the rods will be positioned close to each other and will now be clipped by a C-rail such as seen in FIG. 11 and others.

The invention is not limited to the embodiments described above but all changes and modifications thereof, not constituting departures from the spirit and scope of the invention, are intended to be included.

We claim:

1. A heat recoverable, flat object comprising:
   a plurality of parallel extending core strands formed by helically coiling a first plurality of reinforcing threads around a plurality of parallel polymeric cores;
   a second plurality of reinforcing threads extending across and intersecting transversely said core strands;
   said first and second plurality of reinforcing threads having a tensile strength higher than the polymeric cores at a heat recovering temperature of the object; and
   a cross-linked polymer layer;
   the heat recoverable object formed by embedding said core strands and said second plurality of threads in a thermoplastic polymer layer, cross-linking the polymer layer to form said cross-linked layer,
   stretching said cross-linked polymer layer with embedded core strands and reinforcing threads while in a heated state in the direction of extension of said core strands so that said first plurality of threads are extended on account of their helical coiling, and cooling said cross-linked polymer layer with embedded core strands and reinforcing threads while in a stretched state.

2. A flat heat recoverable object as in claim 1, the cross-linked polymer layer comprising a twin layer formed from two polymeric layers.

3. A flat heat recoverable object as in claim 1, wherein the cross-linked polymer layer and/or the cores comprises silane grafted polyethylene that was cross-linked in the presence of water or steam, and said heated state was a state above the crystalline melting point of the polyethylene.

4. A flat, heat recoverable object as in claim 1, said cores comprising thermoplastic material, and wherein a helix of the original coiling on the cores had a pitch angle that was smaller than 90 degrees but larger than 0 degrees to the longitudinal axis of the respective core.

5. A flat, heat recoverable object as in claim 1, further comprising a thermoplastic layer (2a, FIG. 2) on each of the cores (2, FIG. 2) upon which the first reinforcing threads are coiled, said thermoplastic layer not being crosslinked.

6. A flat, heat recoverable object as in claim 1, said first plurality of reinforcing threads having been placed on the cores following a separate stretching and independent cooling of the cores themselves.

7. A flat, heat recoverable object as in claim 1, wherein said second plurality of reinforcing threads are looped around the plurality of core strands (FIG. 13).

8. A flat, heat recoverable object as in claim 1, wherein said core strands and the threads of the second plurality of reinforcing threads are interwoven (FIGS. 14, 15).

9. A flat, heat recoverable object as in claim 1, wherein said second plurality of reinforcing threads form a mesh (23, FIGS. 5, 12) placed on top of said plurality of parallel core strands but inside the stretched cross-linked polymer layer.

10. A flat, heat recoverable object as in claim 1, said first and/or second reinforcing threads comprising a material selected from the group consisting of glass, polyamide, polyester, metal, cotton, and ceramic.

11. A stretchable and heat recoverable flat object, comprising:
   a plurality of parallelly extending core strands formed by helically coiling a first plurality of reinforcing threads around a plurality of parallel polymeric cores;
   a second plurality of reinforcing threads extending across and intersecting transversely said core strands;
   said first and second plurality of reinforcing threads having a tensile strength higher than said polymeric cores at a heat recovering temperature of the object; and
   a cross-linked polymer layer;
   said stretchable and heat recoverable object formed by embedding said core strands and said second plurality of reinforcing threads in a thermoplastic polymer layer, and cross-linking said thermoplastic polymer to form said cross-linked polymer layer; and
   wherein said cross-linked polymer layer with embedded core strands and reinforcing threads can be stretched while in a heated state in the direction of extension of said core strands, and subsequently cooled while in a stretched state thereby assuming a heat recoverable state.

12. A flat stretchable and heat recoverable object as in claim 11, wherein said core strands are interwoven with the second plurality of reinforcing threads, said core strands serving as weft threads in a resulting web, the second plurality of reinforcing threads serving as warp threads of said web accordingly.

13. A flat stretchable and heat recoverable object as in claim 11, the cross-linked polymer layer comprising a twin layer formed from two polymeric layers.

14. A flat stretchable and heat recoverable object as in claim 11, wherein the cross-linked polymer layer and/or the cores comprises silane grafted polyethylene that was cross-linked in the presence of water or steam, heated above the crystalline melting point of the polyethylene, stretched and cooled in the stretched state.

15. A flat stretchable and heat recoverable object as in claim 11, wherein a helix of the coiling of the first plurality of reinforcing threads on the cores prior to said stretching has a pitch angle that is smaller than 90 degrees but larger than 0 degrees to the longitudinal axis of the respective cores.

16. A flat stretchable and heat recoverable object as in claim 11, further comprising a thermoplastic layer (2a in FIG. 2) on each of the cores (2 in FIG. 2) upon which the first reinforcing threads are coiled, said thermoplastic layer not being crosslinked.

17. A flat stretchable and heat recoverable object as in claim 11, wherein said second reinforcing threads form a mesh (23, FIGS. 5, 12) said mesh placed on top of said plurality of parallelly extending polymer core strands but inside the cross-linked polymer layer.

18. A flat stretchable and heat recoverable object as in claim 11, said first and/or second reinforcing threads comprising a material selected from the group consisting of glass, polyamide, polyester, metal, cotton, and ceramic.

19. A flat stretchable and heat recoverable object as in claim 11, wherein said second plurality of reinforcing threads are looped around the plurality of core strands (FIG. 13).

20. A flat stretchable and heat recoverable object as in claim 1, said cores themselves being stranded threads.

21. A flat, heat recoverable object as in claim 1, said cores comprising a thermoplastic material.

22. A flat, heat recoverable object as in claim 1, said cores comprising a cross-linked polymer.

23. A flat, heat recoverable object as in claim 1, said cores comprising a thermoplastic material.

24. A flat, heat recoverable object as in claim 11, said cores comprising a cross-linked polymer.

* * * * *